United States Patent
Pech et al.

(10) Patent No.: US 8,972,190 B1
(45) Date of Patent: Mar. 3, 2015

(54) SYSTEMS AND METHODS FOR GENERATING TRANSIT TRIPS

(71) Applicant: Google Inc., Mountain View, CA (US)

(72) Inventors: Lucien Pech, Zurich (CH); Albert Graells, Zurich (CH)

(73) Assignee: Google Inc., Mountain View, CA (US)

( * ) Notice: Subject to any disclaimer, the term of this patent is extended or adjusted under 35 U.S.C. 154(b) by 10 days.

(21) Appl. No.: 13/893,983

(22) Filed: May 14, 2013

(51) Int. Cl.
  *G01C 21/00* (2006.01)
(52) U.S. Cl.
  CPC ........................ *G01C 21/00* (2013.01)
  USPC .......................................... 701/540
(58) Field of Classification Search
  USPC .................... 701/54, 117, 533, 540
  See application file for complete search history.

(56) References Cited

U.S. PATENT DOCUMENTS

| | | | |
|---|---|---|---|
| 7,957,871 B1* | 6/2011 | Echeruo ........................ | 701/54 |
| 2003/0045999 A1* | 3/2003 | Joerg et al. ................... | 701/209 |
| 2008/0027772 A1* | 1/2008 | Gernega et al. ................... | 705/7 |
| 2010/0121563 A1* | 5/2010 | Chavez et al. ................. | 701/201 |
| 2011/0112759 A1* | 5/2011 | Bast et al. ...................... | 701/202 |
| 2012/0296885 A1* | 11/2012 | Gontmakher et al. ........ | 707/705 |
| 2013/0024249 A1* | 1/2013 | Zohar et al. ..................... | 705/13 |
| 2013/0060468 A1* | 3/2013 | Delling et al. ................. | 701/527 |

OTHER PUBLICATIONS

Delling et al., "Round-Based Public Transit Routing", Proceedings of the 14th Meeting on Algorithm Engineering and Experiments, Kyoto, Japan, Jan. 16, 2012, pp. 130-140.
Foschini et al., "On the Complexity of Time-Dependent Shortest Paths", Proceedings of the Twenty-Second Annual ACM-SIAM Symposium on Discrete Algorithms, San Francisco, California, Jan. 23-25, 2011, pp. 327-341.

* cited by examiner

*Primary Examiner* — Mary Cheung
*Assistant Examiner* — Anne Mazzara
(74) *Attorney, Agent, or Firm* — Dority & Manning, P.A.

(57) ABSTRACT

Systems and methods for generating transit trips between an origin and a destination are provided. Searches can be undertaken to identify optimal departure times from a source station and/or one or more intermediate stations while maintaining a lowest cost arrival time at a destination station. In this manner, public transportation journey schedules for routes can be determined and recommendations can be provided even if different journey schedules show identical costs.

16 Claims, 6 Drawing Sheets

SYSTEMS AND METHODS FOR GENERATING TRANSIT TRIPS

FIELD

The present disclosure relates generally to public transportation trip planning between an origin and a destination for recommendation to a user.

BACKGROUND

Public transport journey planning systems have been developed which allow travelers to plan their route on public transportation systems between selected start and end destinations, taking into account a selected start time or arrival time for the journey.

The journey may involve the use of more than one transport method, for example different train lines, bus routes or ferries and may involve a transit from a particular station or stop to a different vehicle running on a different route, which may involve walking to accomplish a transit between the routes.

Published schedules of train, bus and other public transportation departure and arrival times for individual stations or stops, hereinafter collectively called stations, have been used to generate data corresponding to a transit graph. The graph includes nodes which each represent a point in space-time at which an event occurs at a particular station, for example an arrival time or a departure time. Arcs joining the nodes represent paths along which the traveler can pass so that a route can be planned in terms of feasible arcs between the nodes.

Thus, by performing a query on the transit graph data, a route can be planned to provide step by step directions to reach a particular destination, using one or more forms of public transportation. The query may be performed on the transit graph data itself or on pre-computed transfer patterns for routes between particular start and end destinations, the pre-computation being performed so as to reduce the data processing required at the time that a user makes a query. For instance, a least cost process can be utilized to query the transit graph data. However, sometimes a query can return different results having the same cost.

SUMMARY

Aspects and advantages of the invention will be set forth in part in the following description, or may be obvious from the description, or may be learned through practice of the invention.

Certain implementations of the present disclosure are directed to three least cost searches of a transit graph to identify suitable journey schedules. When a shortest path algorithm (e.g., Dijkstra's algorithm) is utilized to compute the best trip from station S (source) to station T (target), starting at t1S, the best arrival time at each possible station (such as intermediate stations A and B) can be achieved. If the optimal trip is S→A→B→T, the best possible arrival time at station A is achieved, the best possible arrival time at station B is achieved, and the best possible arrival time at station T, referred to as t1T, is achieved. Such a result is good because the search determines that it is not possible to arrive at station T earlier than t1T, but there is a possibility that there are other trips that depart later than t1S that will still allow arrival at station T at time t1T. A second search can be utilized to solve for such trips.

In order to find the latest trip departing from station A that will allow arrival at station T at time t1T, another shortest path search is utilized, but this time going "backwards" in the graph, doing the search starting at station T and traveling back in time. With this search, the latest departure time from station S that allows arrival at station T optimally at t2S can be determined. In addition, the latest possible departure time for each intermediate leg can be determined. As such, the best (latest) possible departure from station S that allows arrival at station T as early as possible can be determined A problem remains that the connections at the intermediate stations that have been determined are not very good, as there are earlier connections from A→B that are feasible and that won't change optimal times t2S and t1T. Assume that the latest possible departure from station A is T2A.

If a third search going forward in time is performed (in the manner of the first search described above), starting at station S at time t2S, the best possible arrival time at station T can be achieved, which will be UT. In addition, the earliest possible departure at each intermediate node can be determined, which is T3A.

All of the connections A→B that are between times T3A and T2A are good and allow destination station T to be reached as fast as possible, while departing from source node station S as late as possible.

Another exemplary aspect of the present disclosure is directed to a computer-implemented method for public transportation journey planning. The method includes receiving transit graph data describing a plurality of nodes, each node corresponding to the arrival or departure of a vehicle at a station. A first search of the transit graph data is performed to determine a first journey schedule for a route between a source station and a destination station. The first journey schedule includes a first departure time from the source station, a first arrival time at the destination station, and one or more first intermediate departure times from one or more intermediate stations. A second search of the transit graph data is performed to determine a second journey schedule for the route. The second journey schedule includes the first arrival time at the destination station, a second departure time from the source station, and one or more second intermediate departure times from the one or more intermediate stations. The second departure time and the one or more second intermediate departure times are latest times available to achieve the first arrival time at the destination station. A third search of the transit graph data is performed to determine a third journey schedule for the route. The third journey schedule includes the second departure time from the source station, the first arrival time at the destination station, and one or more third intermediate departure times from the one or more intermediate stations. The one or more third intermediate departure times are earliest times available to maintain the second departure time from the source station and the first arrival time at the destination station.

Other exemplary aspects of the present disclosure are directed to systems, apparatus, non-transitory computer-readable media, computer program products, user interfaces and devices for transit route planning.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to generating transit trips between an origin and a destination. Searches can be undertaken to identify optimal departure times from a source station and/or one or more intermediate stations while maintaining a lowest cost arrival time at a destination station. In this manner, public transportation journey schedules for routes can be determined and recommendations can be provided even if different journey schedules show identical costs.

In certain implementations, three least cost searches of a transit graph can be undertaken to identify suitable journey schedules. For instance, a first journey schedule, second journey schedule, and third journey schedule can be evaluated to determine an optimal trip for a user based on available departure times from a source station and available arrival times to a destination station. In certain implementations, a first journey schedule includes a first departure time from a source station, a first arrival time at a destination station, and one or more first intermediate departure times from one or more intermediate stations. A second journey schedule includes the first arrival time at the destination station and a second departure time and one or more second intermediate departure times that are the latest times available to achieve the first arrival time. A third journey schedule includes the second departure time from the source station and the first arrival time at the destination station and one or more third intermediate departure times that are the earliest times available to maintain the second departure time and the first arrival time. In this manner, respective times can be compared to determine optimal departure times from a source station and/or one or more intermediate stations while maintaining a lowest cost arrival time at a destination station.

Figure 1:
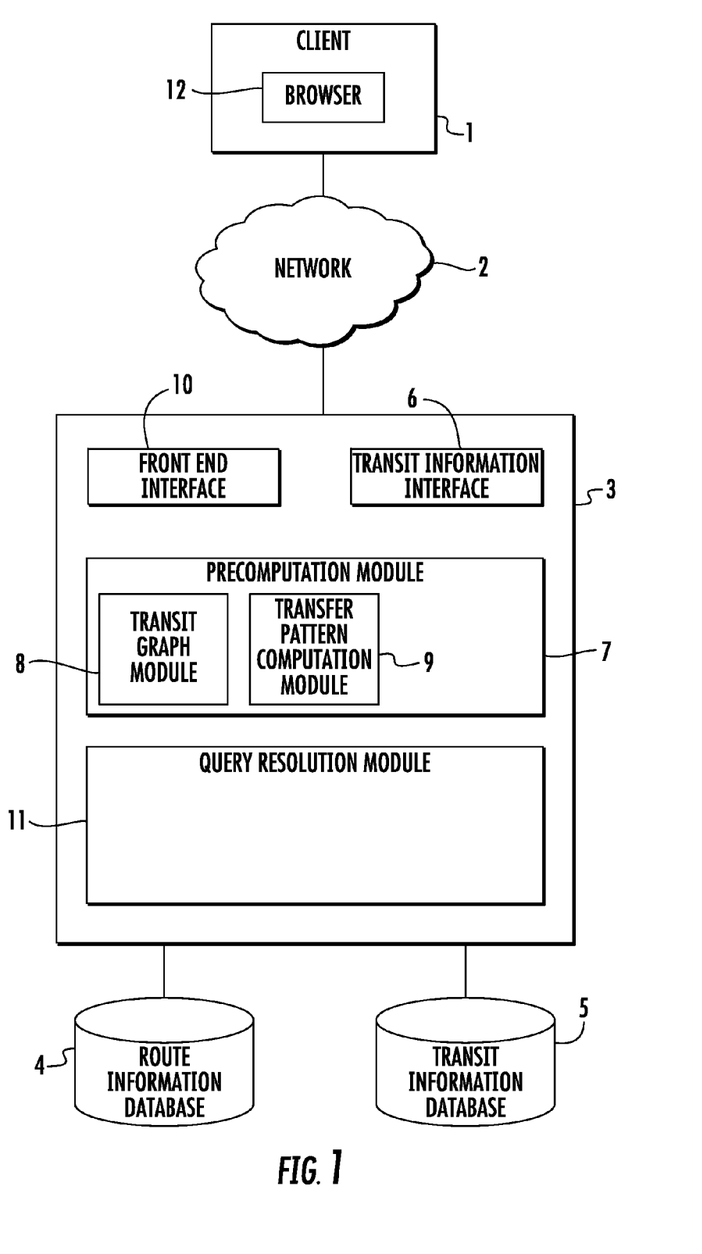
FIG. 1 depicts a schematic block diagram of a route planning system according to an exemplary embodiment of the present disclosure.

FIG. 1 is a block diagram of public transport journey solution in which a user may use a client device 1 connected through a network 2 to a transit server 3 which is provided with a route information database 4 at a transit database information 5. The network 2 may comprise any suitable network such as the Internet or other WAN, a wireless telecommunications network or a LAN, which may be wired or wireless. The client device may comprise a personal computing device, which may be portable or a mobile telecommunications device for example with Internet functionality.

The transit server 3 is configured to respond to queries from a user client 1 to provide route planning information to the user in response to a query for an optimum route between a user defined start or source destination and a user defined end destination, for example for a particular start time or arrival time.

As shown in FIG. 1, the transit server 3 comprises a number of processing modules. It will be appreciated that the term "module" refers to computer logic utilized to provide specified functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

Also, it will be appreciated that embodiments of the server 3 can have different or other modules to the ones described herein, with the described functionalities distributed among the modules in a different manner.

Referring to FIG. 1, the transit server 3 is configured to develop data corresponding to a transit graph. The server includes a transit information interface 6 which receives transport schedule information as published by different public transportation service providers such as rail transport systems providers, bus companies and the like. In one example, each agency providing such schedule information is in communication with the transit server 3 to provide the scheduling information in a specified format such as the Google transit feed specification (GTFS) described at http://code.google.com/transit/spec/transit_feed_specification.html. The transit information received includes public transportation schedules describing calendar dates when a public transport vehicle makes a particular trip and station information e.g. the address describing stations where stops are made along the trip. Other attributes of the trip may include the monetary cost and the times where stops are made at different stations along a particular route.

The received transit information is stored in a transit information database 5 from the different information sources. For example, the database 5 may store bus schedule information from a public bus system, train schedule information for local commuter trains, long distance trains and subway schedules for a subway system. Other scheduling information will also be evident to those skilled in the art.

The data stored in the transit information database 5 is stored in terms of a transit graph which is prepared by a pre-computation module 7, which includes a transit graph module 8 and also a transfer pattern computation module 9 to be described hereinafter.

For each arrival and/or departure of the vehicle at a station, the transit graph module 8 inserts nodes into a transit graph in which one axis represents the distance between stations and another axis represents the passage of time. Typically two nodes are inserted representing respectively an arrival event and a departure event, at the respective times of day. Thus, if a vehicle does not arrive/depart at a station, no node is created at this station since no departure or arrival event occurs at this station. Since nodes in the transit graph are generated from the specified scheduling information received by the interface 6, each node is associated with a vehicle at a station at a specific time. A node in the transit graph can be a station node or an onboard node. A station node represents a vehicle at a station that a user can board in order to make a trip. In contrast, an onboard node represents a public transit vehicle on which a user is currently boarded that is located at the station associated with the node. Nodes in the transit graph are connected to one another by arcs that describe the route of a trip. In the examples described herein, there are four types of arcs: boarding arcs describing a vehicle being boarded at a station, boarding or alighting arcs describing a vehicle being exited at a station with optional walking if a person should walk to another station to board a transit vehicle to complete a journey, waiting arcs describing a person waiting at a transit station, and transit arcs describing staying onboard a vehicle between two stops of a trip.

As mentioned above, the transit graph module 8 analyzes the schedule information received through the interface 6 to determine the events taking place at individual stations. Based on the event, the transit graph module 8 places a corresponding node (either station or onboard) in the transit graph and connects the nodes with arcs. The type of arc connecting two nodes is based upon whether the nodes being connected are station or onboard nodes. For example, if the transit information describes that a vehicle is boarded at station A and travels to station B without a transfer, the transit graph module 8 includes a station node associated with station A in the transit graph and includes an onboard node associated with station B in the transit graph. Thus, the arc connecting the nodes is a boarding arc. In another example, if an onboard node is connected to a station node, the arc connecting the nodes is a boarding arc.

Figure 2:
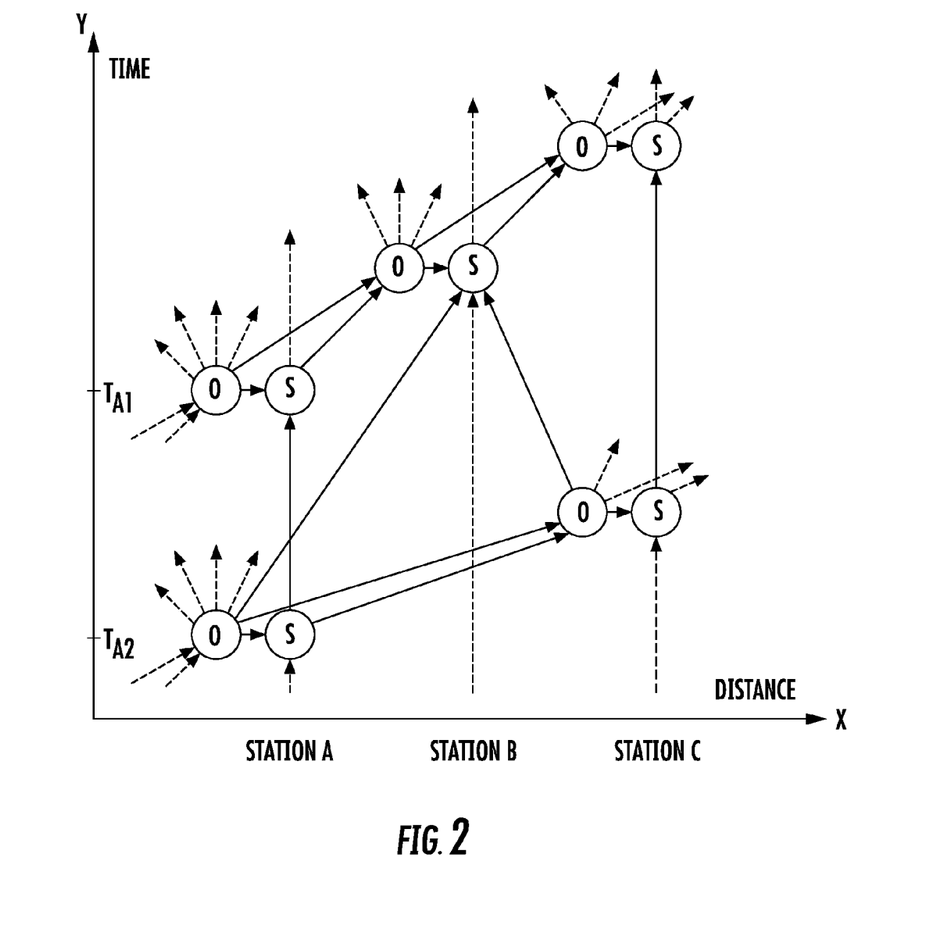
FIG. 2 depicts an illustrative example of a transit graph according to an exemplary embodiment of the present disclosure.

One example of a portion of a transit graph is illustrated in FIG. 2. The Y-axis of the transit graph represents time and the X-axis represents stations A, B, C . . . . It will be appreciated that the X and Y axes here are illustrated as a convenient way to explain the use of the transit graph data, and in actual practice the transit graph data stored in the database 5 does not include an X or Y axis, nor are the nodes of the graph arranged in a spatial manner as shown in FIG. 2.

In this illustration, the Y-axis is a time representation of a single day and for each station S represented on the X-axis, the transit graph module 8 adds a series of nodes to the transit graph, which are arrayed along the Y-axis. Each node in the series associated with a station represents a transit event that occurs at the station at the particular time associated with the node.

As shown in the transit graph, stations A, B, C . . . each include a series of nodes at different time intervals. Nodes labeled with an "S" are station nodes and nodes labeled with an "O" are onboard nodes as previously discussed. Each station node associated with the given station is associated with some event occurring at the station at a particular time. The station nodes S for station A are shown sequentially connected in time, to represent that a person can wait at station A for time period between TA1 and TA2.

Typically, the transit graph data created and stored in the transit information database 5 can comprise arcs for a very large number of nodes, for example for stations distributed over an entire continent or a geographical region e.g. North America or Europe and although a route planning query can be made in respect of the transit graph data, a significant processing time may be involved. To overcome this difficulty, the pre-computation module 7 illustrated in FIG. 1 includes the transfer pattern computation module 9 which is operable to define and pre-compute feasible routes between stations for which the nodes have been stored in a transit information database 5 i.e. pre-computed before a route planning query is carried out.

The feasible routes are computed by performing a search between nodes and along arcs for start and destination stations for a particular journey, by seeking the least cost route along the arcs defined in the transit data database 5 between the nodes. The search may be performed with a suitable search algorithm such as the Dijkstra search algorithm.

Each node may be tagged with a multi-dimensional cost parameter label for items such as journey duration walking between nodes etc. so that a path of least cost can be computed between the start or source node and the destination node. For a particular source and destination node, the optimal transfer patterns between them are computed over a particular time range e.g. 1 day, 1 week or the like and the resulting transfer patterns are stored in the route information database shown in FIG. 4.

The pre-computation of the transfer patterns is performed for at least the major set of pre-defined start-destination pairs of nodes stored in the transit information database 5.

Figure 3:
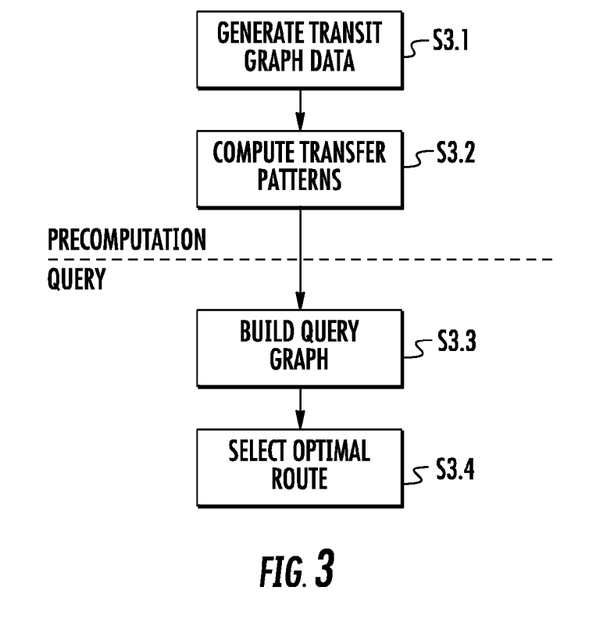
FIG. 3 depicts a schematic flow diagram illustrating the creation of transit graph data and transfer patterns by a pre-computation module shown in FIG. 1, and also the formation of a query graph in response to a user query so as to select an optimal route according to an exemplary embodiment of the present disclosure.

The pre-computation process is illustrated schematically in FIG. 3. At step S3.1, the transit graph module 8 of the pre-computation module 7 computes the transit graph data, which is stored in the transit information database 5 shown in FIG. 1.

At step S3.2, the transfer pattern computation module 9 computes the transfer patterns over a given time period between a plurality of different start and destination nodes as described above and stores the resulting transfer pattern data in the route information database 4.

When a user wishes to plan a journey using the system, they may utilize client 1 to send a query through network 2 to a front end interface 10 which supplies the query to a query resolution module 11 which interrogates the transfer pattern data stored in the route information database 4 as will be described in more detail herein.

The user may use browser 12 running on client 1 to define a source location at which the journey is to commence along with the destination station and a start time of day for the journey. For simplicity in this example the source location is a station which is referred to herein as the source station but it will be appreciated that the source location can be any other suitable map location. This information is communicated to the query resolution module 11, which then builds a query graph from the transfer patterns stored in database 4 in respect of the user defined source and destination stations. This is illustrated at step S3.3 in FIG. 3.

The query is then run on the data of the query graph at step S3.4 in order to select the optimal route between the source and destination stations.

Figure 4:
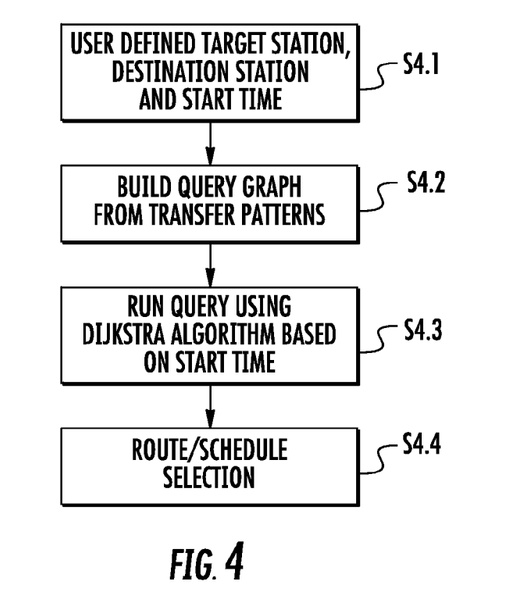
FIG. 4 depicts a flow diagram illustrating the performance of the query according to an exemplary embodiment of the present disclosure.

Referring to FIG. 4, in step S4.1, the user utilizes browser 12 of client 1 (as illustrated in FIG. 1) to define a query that includes a source station, destination station and a start time for the journey. Alternatively, an arrival time may be defined. The query is transmitted to the query resolution module 11 as shown in FIG. 1, which builds a query graph from the transfer patterns as illustrated in step S4.2.

From the foregoing, it will be appreciated that the query graph that is specific to the defined start and destination stations at the defined time may include a number of feasible routes defined by the arcs extending between candidate nodes situated between the source and destination nodes.

At step S4.3, the query resolution module 11 runs a query using a suitable search algorithm, based on the defined start time to identify one or more routes of least cost, so as to select a route and associated schedule as illustrated at step S4.4. For instance, in accordance with certain aspects of the present disclosure, the query can include three least cost searches the query graph. Any suitable search algorithm may be used and by way of illustrative example, the use of a Dijkstra algorithm will be described hereinafter, although other algorithms of similar functionality will be evident to those skilled in the art.

Figure 5:
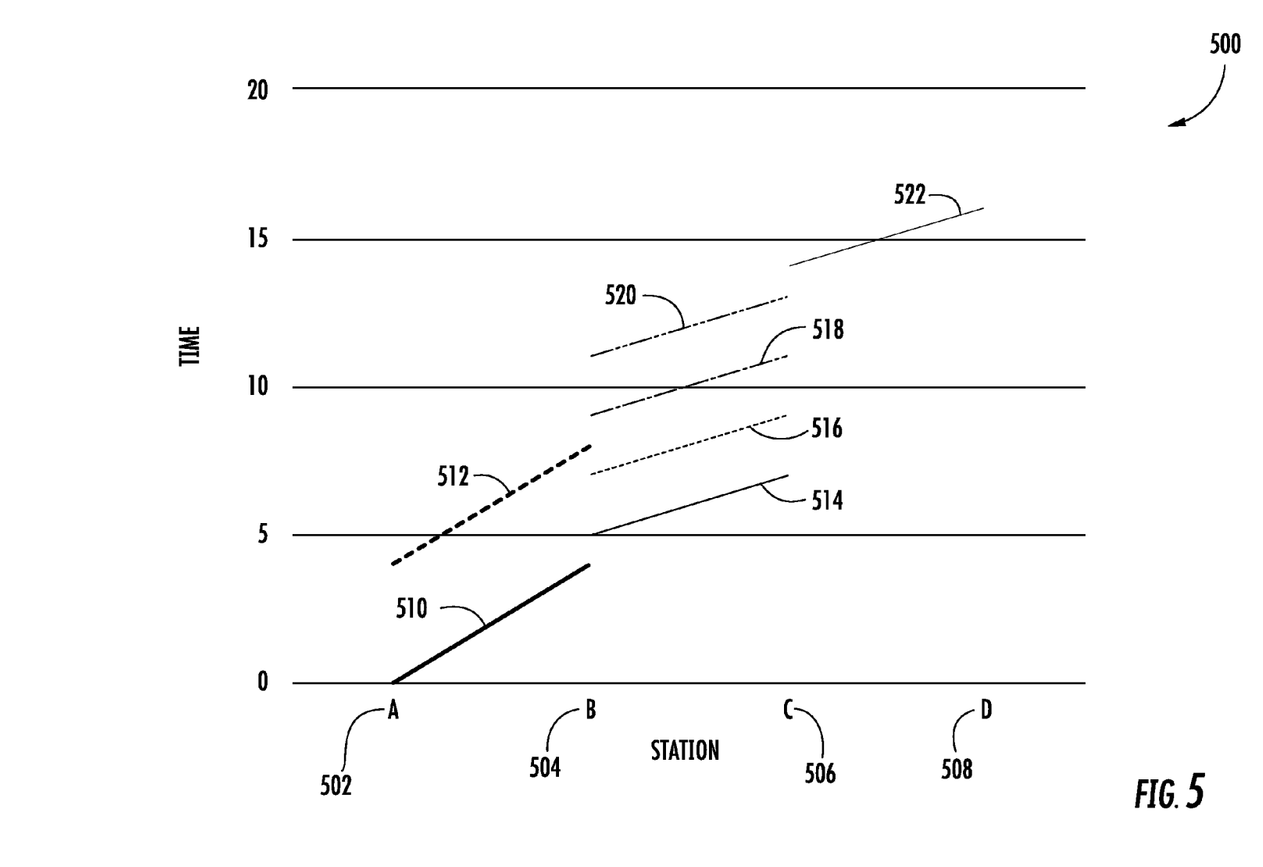
FIG. 5 depicts an illustrative example of a line graph according to an exemplary embodiment of the present disclosure.

Referring to FIG. 5, a line graph 500 is illustrated with the Y-axis of the graph representing time and the X-axis representing stations. As illustrated, the line graph illustrates trips in which a user departs from station A (502), takes a transit trip from station A (502) to station B (504), transfers at station B (504), takes a transit trip from station B (504) to station C (506), transfers at station C (506), and takes a transit trip from station C (506) to station D (508).

A least cost search, such as a Dijkstra search, considers 1) transit trips departing from station A (502) after time T, that arrive the earliest at station B (504) (at time TB), 2) transit trips departing from station B (504) after time T, that arrive the earliest at station C (506) (at time TC), 3) transit trips departing from station C (506) after time T, that arrive the earliest at station D (508) (at time TD).

Thus, TD is the earliest possible arrival time at station D (508), given the departure time T at station A (502). However, the sequence of three trips returned by this least cost search can be bad for the user. As an example, if T is in the evening, the user could be required to spend the whole night at station B or station C. By contrast, if the user departs from station A the following morning, the user might still arrive at TD.

So to find the latest departure time that allows the user to arrive at time TD, a second least cost search, such as a Dijkstra search, can be performed in the reversed graph. Departing from station D (508) the search considers 1) transit trips arriving at station D (508) at time TD, that depart the latest from station C (506) at time TC2, 2) transit trips arriving at station C (506) before time TC2, that depart the latest from station B (504) at time TB2, 3) transit trips arriving at station B (504) before time TB2, that depart the latest from station A (502) at time TA2.

Therefore, TA2 is the latest time at which a trip departs from station A (502), and arrives at time TD at station D (508). But this sequence of trips may still be bad for the user. Indeed, at any intermediate step, the sequence provides the latest possible vehicle, even though an earlier vehicle is present. From a user perspective, taking the earliest possible vehicle at each step is often preferable.

As such, a third least cost search, such as a Dijkstra search, can be performed departing from station A (502), at time TA2. This search is similar to the first search, and will arrive at the same time TD (but the intermediate steps may differ).

For example, referring again to FIG. 5, Trip 1 depicts a semi-frequent commuter train that runs between A and B from 8:00 to 8:04 (510), and from 8:04 to 8:08 (512). Trip 2 depicts a frequent bus that runs every 2 minutes between B and C from 8:05 to 8:07 (514), from 8:07 to 8:09 (516), from 8:09 to 8:11 (518) and from 8:11 to 8:13 (520). Trip 3 depicts a less frequent train that runs from C to D from 8:14 to 8:16 (522).

The departing time T is 8:00. With the first search we compute 510→514→522 (522 provides the earliest arrival). The best arrival time is 8:16, but the duration of the trip is 16 minutes. With the second search, 522←520←512 (512 provides the latest departure). The best departure time is 8:04, overall duration is 12 minutes, but a bus at station B (504) was skipped, which is not ideal for a user. With the third search, 512→518→522. As such, the bus [8:09, 8:11] (518) at station B that was previously skipped in the second search is captured in the third search. The optimal trip is 512→{all the connections between 518 and 520 inclusive}→522. In this manner, the three search process described herein can identify optimal departure times from a source station and/or one or more intermediate stations while maintaining a lowest cost arrival time at a destination station.

In certain aspects of the present disclosure, in the third search of the intermediate transit steps in which multiple identical transit trips are identified, the system can further evaluate the trip to select based on other criteria such as fare, mode of transportation, safest mode of transportation, transit provider (agency), vehicle type, or a penalty associated with undesirable factors such as a walking penalty, or the like.

The resulting data is then transmitted by the server 3 through the front end interface 10 and network 2 to the client 1 so as to be presented on browser 12 to the user. The route/schedule is displayed in terms of the stations to be utilized for the selected route, along with details of any transfers or transit required between different train or bus lines and the associated times.

Figure 6:
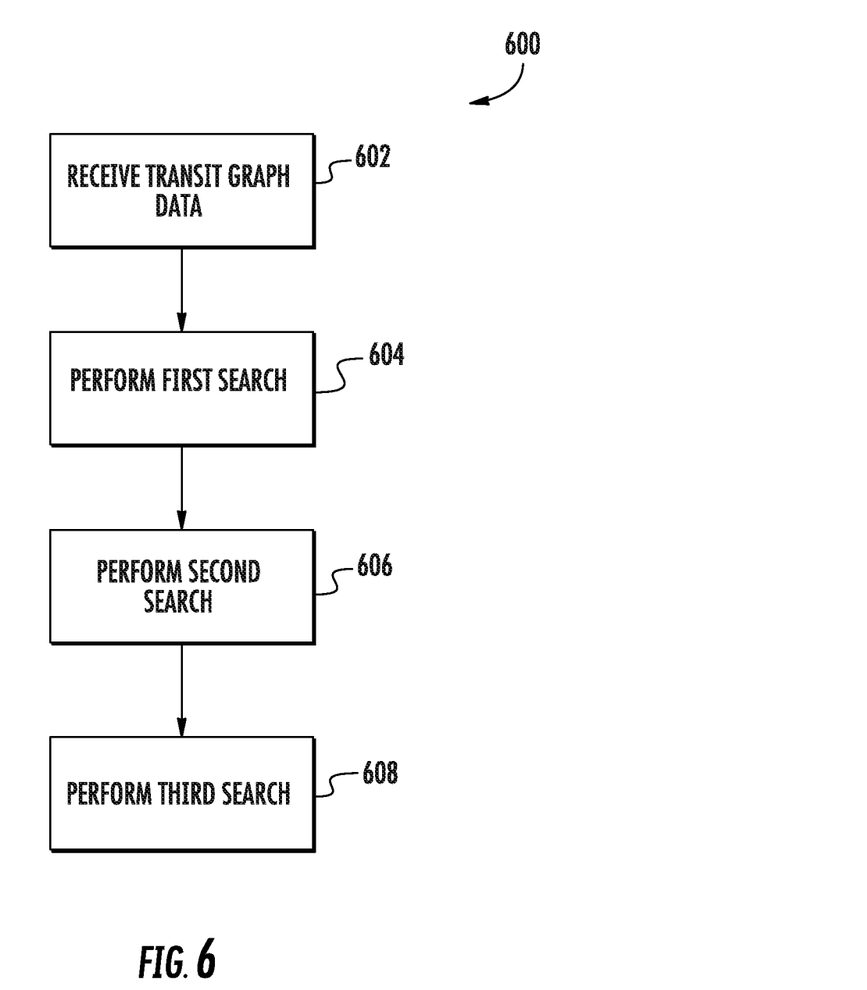
FIG. 6 depicts a flowchart of an exemplary method for transit route planning according to an exemplary embodiment of the present disclosure.

FIG. 6 depicts a flow diagram of an exemplary method (600) for public transportation journey planning according to an exemplary embodiment of the present disclosure. While exemplary method (600) will be discussed with reference to the system of FIG. 1, method (600) can be implemented using any suitable computing system. In addition, although FIG. 6 depicts steps performed in a particular order for purposes of illustration and discussion, methods of the present disclosure are not limited to such particular order or arrangement. One skilled in the art, using the disclosures provided herein, will appreciate that various steps of the method (600) can be omitted, rearranged, combined, and/or adapted in various ways without deviating from the scope of the present disclosure.

At (602) transit graph data describing a plurality of nodes is received. As an example, transit graph data can be received by transit information database 5, with each node corresponding to the arrival or departure of a vehicle at a station.

At (604) a first search of the transit graph data is performed to determine a first journey schedule for a route between a source station and a destination station. The first journey schedule includes a first departure time from the source station, a first arrival time at the destination station, and one or more first intermediate departure times from one or more intermediate stations.

At (606) a second search of the transit graph data is performed to determine a second journey schedule for the route between the source station and the destination station. The second journey schedule includes the first arrival time at the destination station, a second departure time from the source station, and one or more second intermediate departure times from the one or more intermediate stations. The second departure time and the one or more second intermediate departure times are latest times available to achieve the first arrival time.

At (608) a third search of the transit graph data is performed to determine a third journey schedule for the route between the source station and the destination station. The third journey schedule includes the second departure time from the source station, the first arrival time at the destination station, and one or more third intermediate departure times from the one or more intermediate stations. The one or more third intermediate departure times are earliest times available to maintain the second departure time and the first arrival time.

Figure 7:
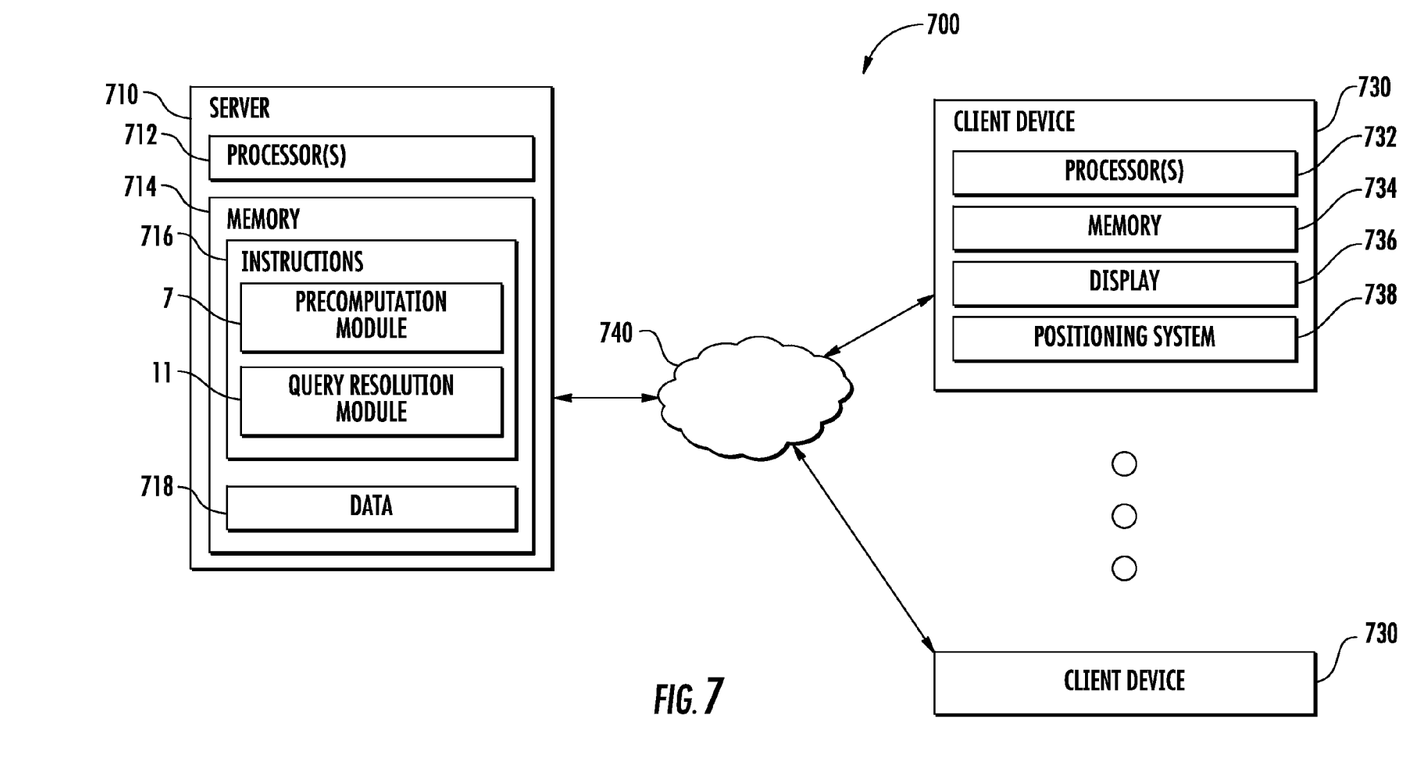
FIG. 7 depicts a block diagram of an exemplary computer-based system for transit route planning according to an exemplary embodiment of the present disclosure.

FIG. 7 depicts an exemplary computing system 700 that can be used to implement the methods and systems for transit routing planning according to aspects of the present disclosure. The system 700 is a client-server architecture that includes a server 710 that communicates with one or more client devices 730 over a network 750. The system 700 can be implemented using other suitable architectures, such as a single computing device.

The system 700 includes a server 710, such as a web server. The server can be implemented using any suitable computing device(s). The server 710 can have a processor(s) 712 and a memory 714. The server 710 can also include a network interface used to communicate with one or more remote computing devices (e.g. client devices) 730 over a network 740.

The processor(s) 712 can be any suitable processing device, such as a microprocessor, microcontroller, integrated circuit, or other suitable processing device. The memory 714 can include any suitable computer-readable medium or media, including, but not limited to, non-transitory computer-readable media, RAM, ROM, hard drives, flash drives, or other memory devices. The memory 714 can store information accessible by processor(s) 712, including instructions 716 that can be executed by processor(s) 712. The instructions 716 can be any set of instructions that when executed by the processor(s) 712, cause the processor(s) 712 to provide desired functionality. For instance, the instructions 716 can be executed by the processor(s) 712 to implement the precomputation module 7, and the query resolution module 11.

Memory 714 can also include data 718, such as transit graphs generated for time transit routes, that can be retrieved, manipulated, created, or stored by processor(s) 712. The data 722 can be stored in one or more databases. The one or more databases can be connected to the server 710 by a high bandwidth LAN or WAN, or can also be connected to server 710 through network 740. The one or more databases can be split up so that they are located in multiple locales.

The server 710 can exchange data with one or more client devices 730 over the network 740. Although two clients 730 are illustrated in FIG. 7, any number of client devices 730 can be connected to the server 710 over the network 740. As described previously, the client devices 730 can be any suitable type of computing device, such as a general purpose computer, special purpose computer, laptop, desktop, integrated circuit, mobile device, smartphone, tablet, or other suitable computing device.

Similarly the computing device 710, a client device 730 can include a processor(s) 732 and a memory 734. The memory 734 can store information accessible by processor(s) 732, including instructions that can be executed by processor(s) and data. The client device 730 can include various input/output devices for providing and receiving information from a user, such as a touch screen, touch pad, data entry keys, speakers, and/or a microphone suitable for voice recognition. For instance, the computing device 730 can have a display 736 for presenting information, such as recommended transit routes to a user.

The client device 730 can also include a positioning system 738 that can be used to identify the position of the client device 730. The positioning system 738 can be optionally used by the user to monitor the user's position relative to a transit route. The positioning system 738 can be any device or circuitry for monitoring the position of the client device 730. For example, the positioning device 738 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In situations in which the systems and method discussed herein collect information about users, such as position data, user preferences, or other information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in or more ways before it is stored or used, so that personally identifiable information is removed.

The network 740 can be any type of communications network, such as a local area network (e.g. intranet), wide area network (e.g. Internet), or some combination thereof. The network 740 can also include a direct connection between a client device 730 and the server 710. In general, communication between the server 710 and a client device 730 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for public transportation journey planning, the method comprising:
receiving, by one or more computing devices, transit graph data describing a plurality of nodes, each node corresponding to the arrival or departure of a vehicle at a station;
performing, by the one or more computing devices, a first search of the transit graph data to determine a first journey schedule for a route between a source station and a destination station, the first journey schedule comprising a first departure time from the source station, a first arrival time at the destination station, and one or more first intermediate departure times from one or more intermediate stations;

performing, by the one or more computing devices, a second search of the transit graph data to determine a second journey schedule for the route, the second journey schedule comprising the first arrival time at the destination station, a second departure time from the source station, and one or more second intermediate departure times from the one or more intermediate stations, wherein the second departure time and the one or more second intermediate departure times are latest times available to achieve the first arrival time at the destination station;

performing, by the one or more computing devices, a third search of the transit graph data to determine a third journey schedule for the route, the third journey schedule comprising the second departure time from the source station, the first arrival time at the destination station, and one or more third intermediate departure times from the one or more intermediate stations, wherein the one or more third intermediate departure times are earliest times available to maintain the second departure time from the source station and the first arrival time at the destination station; and presenting to a user, by the one or more computing devices, one or more of the first departure time, the first arrival time, the one or more first intermediate departure times, the second departure time, the one or more second intermediate departure times, or the one or more third intermediate departure times.

2. The computer-implemented method of claim 1, wherein the first search, the second search, and the third search of the transit graph data each comprise a least cost search process.

3. The computer-implemented method of claim 2, wherein the least cost search process comprises a Dijkstra algorithm.

4. The computer-implemented method of claim 1, wherein the method comprises pre-computation of scheduling data to provide the transit graph data.

5. The computer-implemented method of claim 1, wherein the method comprises:
performing a pre-computation for a plurality of pairs of stations represented in the transit graph data, to provide at least one transfer pattern that corresponds to at least one feasible route between each respective pair of stations;
storing the at least one transfer pattern for the pairs of stations; and
performing the first search, the second search, and the third search, on the stored transfer patterns to determine the first journey schedule, second journey schedule, and third journey schedule for the route between the source station and the destination station.

6. The computer-implemented method of claim 1, wherein the method comprises presenting to a user one or more of the second departure time, the first arrival time, and the one or more third intermediate departure times.

7. The computer implemented method of claim 1, wherein the second departure time comprises an associated arrival time, the first arrival time comprises an associated departure time, and the one or more third intermediate departure times comprise associated intermediate departure times.

8. The computer-implemented method of claim 7, wherein the method comprises presenting to a user one or more of the second departure time, the associated arrival time, the first arrival time, the associated departure time, the one or more third intermediate departure times, and the associated intermediate departure times.

9. A computing system for public transportation journey planning comprising:
a memory configured to store transit graph data describing a plurality of nodes, each node corresponding to the arrival or departure of a vehicle at a station;
a processor configured to determine a first journey schedule from the transit graph data for a route between a source station and a destination station, the first journey schedule comprising a first departure time from the source station, a first arrival time at the destination station, and one or more first intermediate departure times from one or more intermediate stations;
the processor configured to determine a second journey schedule from the transit graph data for the route, the second journey schedule comprising the first arrival time at the destination station, a second departure time from the source station, and one or more second intermediate departure times from the one or more intermediate stations, wherein the second departure time and the one or more second intermediate departure times are latest times available to achieve the first arrival time at the destination station;
the processor configured to determine a third journey schedule from the transit graph data for the route between the source station and the destination station, the third journey schedule comprising the second departure time from the source station, the first arrival time at the destination station, and one or more third intermediate departure times from the one or more intermediate stations, Wherein the one or more third intermediate departure times are earliest times available to maintain the second departure time from the source station and the first arrival time at the destination station; and
the processor configured to present to a user one or more of the first departure time, the first arrival time, the one or more first intermediate departure times, the second departure time, the one or more second intermediate departure times, or the one or more third intermediate departure times.

10. The computing system of claim 9, wherein the first search, the second search, and the third search of the transit graph data each comprise a least cost search process.

11. The computing system of claim 10, wherein the least cost search process utilized by the processor comprises a Dijkstra algorithm.

12. The computing system of claim 9, further comprising a second processor, the second processor configured to pre-compute scheduling data to provide the transit graph data.

13. The computing system of claim 9, wherein the system further comprises an interface for receiving a request for routes between the source station and the destination station.

14. A computer-program product comprising a non-transitory computer readable storage medium storing computer-readable instructions for transit route planning, the instructions when executed by a processor, cause the processor to perform operations, the operations comprising:
determining a first journey schedule for a route between a source station and a destination station, the first journey schedule comprising a first departure time from the source station, a first arrival time at the destination station, and one or more first intermediate departure times from one or more intermediate stations;
determining a second journey schedule for the route between the source station and the destination station, the second journey schedule comprising the first arrival time at the destination station, a second departure time from the source station, and one or more second intermediate departure times from the one or more intermediate stations, wherein the second departure time and the one or more second intermediate departure times are latest times available to achieve the first arrival time at the destination station;

determining a third journey schedule for the route between the source station and the destination station, the third journey schedule comprising the second departure time from the source station, the first arrival time at the destination station, and one or more third intermediate departure times from the one or more intermediate stations, wherein the one or more third intermediate departure times are earliest times available to maintain the second departure time from the source station and the first arrival time at the destination station; and presenting to a user one or more of the first departure time, the first arrival time, the one or more first intermediate departure times, the second departure time, the one or more second intermediate departure times, or the one or more third intermediate departure times.

15. The computer-program product of claim 14, wherein the first journey schedule, second journey schedule, and third journey schedule are determined using a least cost search process.

16. The computer-program product of claim 15, wherein the least cost search process comprises a Dijkstra algorithm.

* * * * *